United States Patent Office 3,247,098
Patented Apr. 19, 1966

3,247,098
CRACKING A NAPHTHA WITH A CRACKING CONVERSION CATALYST COMPRISING A SYNTHETIC MORDENITE ZEOLITE
Charles Newton Kimberlin, Jr., Baton Rouge, La., assignor to Esso Research and Engineering Company, a corporation of Delaware
No Drawing. Filed Nov. 12, 1963, Ser. No. 323,130
11 Claims. (Cl. 208—120)

The present invention deals with improved means of obtaining high octane gasolines by cracking hydrocarbons with certain synthetic crystalline alumino-silicate zeolites. More particularly, it concerns the use of synthetic mordenites as cracking catalysts for virgin and various processed naphthas to yield more valuable products such as gas for use as fuel or chemicals plus a naphtha having an improved octane number.

Mordenite is a highly siliceous zeolite occurring in a number of localities, e.g., Nova Scotia (Case d'Or), Iceland (Berufiord) and Idaho (Challis). This zeolite has been synthesized repeatedly and its molecular-sieve properties have been investigated in some detail. See in this connection R. M. Barrer, Die Trennung von Molekülen mit Hilfe von Kristallsieben 35 Brennstoff-Chemie, 325–334 (1954).

The mordenite type zeolite employed in the practice of the present invention is distinguished from the above known naturally occurring mordenite samples in that the mordenite employed in the present invention exhibits ability to adsorb cyclics, aromatics, naphthenes and isoparaffins and may be characterized as a mordenite having the ability to adsorb at least 1.5 wt. percent of benzene in the sodium form or 5.0 wt. percent of benzene in the hydrogen form at a temperature of 205° F. and a pressure of 0.5 atmosphere. These mordenite zeolites employed in the practice of the present invention are chemically represented by the following formula:

$$0.9 \pm 0.2 : Me_{2/n}O : Al_2O_3 : X\ SiO_2 \text{ (anhydrous form)}$$

wherein Me is selected from the group consisting of metal cations and hydrogen-containing cations, $n$ is the cation valence, and X is a number from about 9 to 15, and usually about 10. While this molar formula also represents naturally occurring mordenite, the naturally occurring variety thereof normally fails to show adsorptive affinity for cyclics and aromatics as indicated previously. Mordenite type zeolites employed in the practice of the present invention are commercially available from the Norton Company of Worcester, Massachusetts. These zeolites having an effective pore diameter in the range between about 6 to 10 A.

The mordenite zeolite is normally produced or found in its sodium form and must be treated to reduce its sodium content to less than 5 wt. percent in order to serve as an effective cracking catalyst. This may be done by cation exchange with various salts of metals which have no detrimental effect on the cracking reaction, e.g., magnesium, calcium, aluminum, the rare earths, or alternatively and preferably, by exchange with a hydrogen-containing cation, e.g., acid hydrogen or an ammonium ion containing the material. When employing the latter, the resulting ammonium derivative is then dried and calcined to decompose the ammonium ion to give what has been termed the hydrogen form of the zeolite.

The base exchange step with various metal cations or hydrogen-containing cations is normally conducted at temperatures of 50° to 150° F. by conventional base exchange with a suitable salt of the cation which is desired to be introduced into the mordenite zeolite to replace sodium.

The conditions for the cracking reaction conducted in accordance with the present invention are generally those well known in the art. It involves cracking of a hydrocarbon stream, preferably petroleum naphthas boiling in the range of about 100° to 450° F. in the presence of the cracking catalyst of the present invention, i.e., an exchanged form of a mordenite zeolite having the ability to adsorb at least 1.5, preferably 5, wt. percent of benzene at 205° F. Reaction temperatures are generally from 700° to 1000° F., preferably 830° to 960° F. Feed rate of the reactant hydrocarbon stream can be from about 1.6 to 20.0 w./hr./w., preferably 5 to 10 w./hr./w. A diluent may be used in the cracking zone. Suitable diluents include steam and hydrogen gas introduced with the naphtha feed. When steam is used as a diluent, it may be employed in amounts of 1 to 20 wt. percent of the feed, preferably 2 to 10%. When operating without a diluent, or when employing steam as a diluent, the range of pressures employed is atmospheric to 25 p.s.i.g., preferably atmospheric to 15 p.s.i.g. When hydrogen gas is used as a diluent, it may be introduced at a rate in the range of 1,000 to 10,000 cubic feet per barrel of feed, preferably 6,000 to 8,000 cf./b. When employing hydrogen gas as a diluent, it is preferred to operate at a pressure in the range of 500–1500 p.s.i.g., more preferably in the range of 800 to 1200 p.s.i.g.

Up to the present time there have been many attempts to crack light naphtha, i.e., naphthas boiling in the range of about 100 to 450° F. Use of traditional cracking catalysts such as silica alumina, did not work as these catalysts were not sufficiently active to cause any substantial upgrading of the naphtha stream. It has now unexpectedly been found that exchanged forms of a crystalline aluminosilicate zeolite, e.g., mordenite, are extremely active catalysts for the conversion of light naphtha to lighter components. The resultant light products are useful as fuel or chemicals while the resultant naphtha produced by the process has an improved octane number and therefore its commercial value is greatly enhanced. Conversions of up to 60% were obtained dependent on run length of 15 to 30 minutes. The results are made more surprising by the fact that a magnesium exchanged 13 A. sieve, such as for example the magnesium form of a synthetic faujasite sieve, gave very poor conversion, e.g., less than 10%, under similar conditions, in spite of the fact that such magnesium 13 A. aluminosilicates are known to be active cracking catalysts.

The various aspects and modifications of the present invention will be made more clearly apparent by reference to the following description and accompanying examples.

Example 1

A hydrogen form mordenite type zeolite, obtained from the Norton Company of Worcester, Massachusetts, and produced from a synthetic sodium form mordenite by treatment with dilute acid to replace the sodium ions with hydrogen ions was employed. It had a silica to alumina mole ratio of about 10 and a soda content of about 0.9 wt. percent $Na_2O$ and was capable of adsorbing about 6.2 wt. percent benzene, 5.0 wt. percent cyclohexane, or 4.6 wt. percent n-hexane at 205° F. and 0.5 atmosphere pressure. It had an effective pore size of about 6–10 A. This mordenite form was used as a cracking catalyst for converting light naphthas to lighter products of improved octane number. The results obtained using different feedstocks, feed rates, and temperatures are summarized in Table I.

TABLE I [1]

| Run No. | Feed #1, virgin naphtha from South Louisiana crude | 1 | 2 | 3 | 4 | 5 | Feed #2, 318/425° F. catalytic naphtha | 6 | 7 |
|---|---|---|---|---|---|---|---|---|---|
| Temperature, ° F. | | 950 | 950 | 950 | 900 | 900 | | 950 | 950 |
| Feed rate, w./hr./w. | | 5.8 | 1.83 | 5.5 | 5.5 | 13.0 | | 6.3 | 2.0 |
| Minutes fed | | 5 | 5 | 5 | 5 | 4 | | 4 | 5 |
| Product dist., wt. percent of feed: | | | | | | | | | |
| $H_2$ | | 0.27 | 0.89 | 0.16 | 0.12 | 9.07 | | 0.14 | 0.42 |
| $CH_4$ | | 1.00 | 3.74 | 0.71 | 0.58 | 0.29 | | 0.53 | 1.53 |
| $C_2H_4$ | | 0.91 | 1.66 | 1.23 | 0.80 | 0.50 | | 0.90 | 0.63 |
| $C_2H_6$ | | 1.23 | 4.16 | 0.82 | 0.85 | 0.41 | | 0.60 | 1.96 |
| $C_3H_6$ | | 2.25 | 3.02 | 2.73 | 1.75 | 1.32 | | 2.20 | 0.85 |
| $C_3H_8$ | | 9.56 | 22.62 | 7.36 | 11.69 | 5.86 | | 3.81 | 9.76 |
| $C_4H_8$ | | 1.67 | 2.25 | 2.26 | 1.06 | 0.88 | | 1.57 | 0.58 |
| $i-C_4H_{10}$ | | 5.25 | 9.36 | 5.05 | 8.49 | 5.11 | | 2.39 | 3.18 |
| $n-C_4H_{10}$ | | 2.12 | 4.48 | 1.67 | 2.89 | 1.41 | | 0.82 | 1.40 |
| $C_5H_{10}$ | | 0.83 | 1.03 | 1.30 | 0.30 | 0.23 | | 0.41 | 0.18 |
| $i-C_5H_{12}$ | | 1.61 | 2.74 | 1.61 | 2.71 | 1.18 | | 0.59 | 0.92 |
| $n-C_5H_{12}$ | | 0.25 | 0.45 | 0.22 | 0.38 | 0.16 | | 0.21 | 0.17 |
| $C_6H_6$ | | 0.15 | 0.49 | 0.03 | 0.10 | 0.04 | | 0.10 | 0.24 |
| $C_6H_{12}$ | | 0.49 | 0.66 | 0.58 | 0.12 | 0.06 | | 0.14 | 0.09 |
| $C_6H_{14}$ | | 1.00 | 1.53 | 0.59 | 0.58 | 0.27 | | 1.15 | 0.60 |
| $C_7+$ | | 0.17 | 0.36 | 0.07 | 0.06 | 0.02 | | 0.05 | 0.09 |
| Total | | 28.8 | 59.4 | 26.4 | 32.5 | 16.8 | | 15.6 | 22.6 |
| Liquid | | 65.7 | 23.5 | 69.5 | 61.6 | 80.1 | | 79.8 | 64.0 |
| Carbon | | 5.5 | 17.1 | 4.1 | 5.9 | 3.1 | | 4.6 | 13.4 |
| Liquid prod., MS anal., wt. percent: | | | | | | | | | |
| Benzene | 0.11 | 0.64 | 1.67 | 0.71 | 0.87 | 0.43 | 0.18 | 1.36 | 2.97 |
| Toluene | 1.47 | 3.21 | 7.61 | 3.44 | 4.57 | 2.21 | 0.79 | 4.53 | 10.87 |
| $C_8$ arom | 6.69 | 8.63 | 13.00 | 8.74 | 11.39 | 7.84 | 3.16 | 7.84 | 15.26 |
| $C_9$ arom | 2.09 | 4.21 | 5.50 | 3.93 | 5.84 | 4.43 | 19.86 | 22.61 | 23.03 |
| $C_{10}$ arom | 0.85 | 1.06 | 1.06 | 1.02 | 1.44 | 1.30 | 16.19 | 16.01 | 12.99 |
| $C_{11}+$ arom | | | | | | | 6.63 | 4.24 | 2.02 |
| Naphthalenes | 0.30 | 1.01 | 1.46 | 0.90 | 1.13 | 1.00 | 0.57 | 3.02 | 6.31 |
| Indanes | | | | | | | 9.96 | 6.51 | 2.58 |
| Total arom | 12.42 | 18.76 | 30.29 | 18.74 | 25.24 | 17.21 | 57.34 | 66.12 | 76.04 |
| Cyclopentanes | 1.70 | 3.27 | 4.69 | 4.48 | 4.29 | 2.68 | 4.93 | 1.84 | 1.79 |
| Cyclohexanes | 26.64 | 21.57 | 15.85 | 21.43 | 16.14 | 23.22 | 12.26 | 10.68 | 6.74 |
| Cond. Naph. | 3.64 | 3.14 | 1.91 | 4.49 | 2.57 | 3.91 | 6.37 | 3.77 | 2.00 |
| Paraffins | 55.59 | 53.26 | 47.27 | 51.15 | 51.76 | 52.98 | 19.09 | 17.59 | 13.43 |
| Liquid prod., GC dist.: | | | | | | | | | |
| IBP, ° F. | | 142 | | 190 | 130 | | 318 | 145 | 157 |
| 10% at ° F. | 235 | 187 | | 216 | 166 | | 332 | 280 | 250 |
| 20% at ° F. | 245 | 203 | | 225 | 212 | | 345 | 327 | 282 |
| 30% at ° F. | 253 | 250 | | 236 | 242 | | 359 | 355 | 332 |
| 40% at ° F. | 262 | 268 | | 250 | 255 | | 372 | 370 | 345 |
| 50% at ° F. | 283 | 282 | | 267 | 260 | | 383 | 377 | 358 |
| 60% at ° F. | 292 | 290 | | 285 | 276 | | 395 | 385 | 370 |
| 70% at ° F. | 298 | 310 | | 293 | 290 | | 406 | 390 | 385 |
| 80% at ° F. | 308 | 322 | | 302 | 307 | | 415 | 405 | 405 |
| 90% at ° F. | 325 | 340 | | 327 | 355 | | 425 | 440 | 433 |

[1] A 20 cc. microcatalytic cracking unit was used for these tests.

TABLE I—Continued

| Run No. | Feed #3, Aramco $C_5/C_6$ virgin naphtha | 8 | 9 |
|---|---|---|---|
| Temperature, ° F. | | 950 | 950 |
| Feed rate, w./hr./w. | | 1.6 | 5.2 |
| Minutes fed | | 5 | 5 |
| Product distribution, wt. percent of feed: | | | |
| $H_2$ | | 0.41 | 0.21 |
| $CH_4$ | | 2.40 | 0.95 |
| $C_2H_4$ | | 1.29 | 1.26 |
| $C_2H_6$ | | 3.29 | 1.29 |
| $C_3H_6$ | | 2.02 | 3.42 |
| $C_3H_8$ | | 33.40 | 16.10 |
| $C_4H_8$ | | 0.19 | |
| $i-C_4H_{10}$ | | 5.64 | 3.38 |
| $n-C_4H_{10}$ | | 4.28 | 2.86 |
| $C_5H_{10}$ | | 2.17 | |
| $i-C_5H_{12}$ | | 1.43 | 0.66 |
| $n-C_5H_{12}$ | | 1.36 | 2.22 |
| $C_6H_6$ | | 0.35 | 0.18 |
| $C_6H_{12}$ | | 0.74 | 0.34 |
| $C_6H_{14}$ | | 4.59 | 7.32 |
| $C_7+$ | | 0.27 | 0.10 |
| Total | | 63.80 | 40.30 |
| Liquid | | 25.7 | 54.7 |
| Carbon | | 10.5 | 5.0 |
| Liquid product, wt. percent: | | | |
| $C_3$ | | 0.2 | |
| $i-C_4$ | | 0.8 | |
| $n-C_4$ | | 1.2 | |
| $i-C_5$ | 1.8 | 2.7 | |
| $n-C_5$ | 7.1 | 6.2 | |
| 2,2 DMB | 0.1 | 0.3 | |
| 2,3 DMB+CP | 18.4 | 8.9 | |
| 2,2,3-TMB | | | |
| 3-MP | 13.1 | 11.3 | |
| $n-C_6$ | 43.2 | 30.3 | |
| 2,2-DMP | | | |
| 2,4-DMP+MCP | 6.8 | 1.2 | |

TABLE I—Continued

| Run No. | Feed #3, Aramco $C_5/C_6$ virgin naphtha | 8 | 9 |
|---|---|---|---|
| Liquid product, wt. percent—Continued. | | | |
| 3,3-DMP | | 0.1 | |
| 2,3-DMP | | | |
| CH+2-MH | | 4.8 | 0.5 |
| 3-MH+1, 1-DMP | | 2.0 | 1.9 |
| 1,3-DMCP+3-EP | | 0.2 | 0.1 |
| $n-C_7+$ | | 1.4 | 8.5 |
| $C_6H_6$ | | 2.3 | 0.0 |
| Paraffins | | 84.7 | 72.2 |
| Naphthenes | | 12.2 | 2.0 |

Examination of Table I reveals that the hydrogen exchange form of mordenite is an active catalytic agent for light naphthas boiling in the range of about 100–450° F. Feed naphtha #1 of Table I, from South Louisiana crude, was converted into a liquid product having a substantially lower boiling point. A relatively high concentration of desirable aromatics was produced. Furthermore, the cracking process yielded significant quantities of isoparaffins which increase the octane value of the product. Carbon-make was at a relatively low level especially in the cases where the feed rate was maintained between about 5.5 to 5.8 w./hr./w. Greater aromatization, as well as increased light paraffin production and carbon-make were evidenced when the feed rate was maintained at about 1.8 w./hr./w. In the latter case the advantage of higher conversion to aromatic and isoparaffinic products is accompanied by greater carbon and gas make. Lowering of the reaction temperature from 950° F. to 900° F. had the effect of increasing the quantity of aromatic and isoparaffinic products.

Use of the 318/425/ F. catalytic naphtha feedstock resulted in a relative diminishing of the activity of the catalyst. However, the mordenite catalyst did effect a substantial lowering of the boiling point of the liquid product compared to the feed stream. Also total aromatics concentration was increased (especially in the case of a 2.0 w./hr./w. feed rate), as was the isoparaffin concentration. As in the case of the virgin naphtha #1 feedstock, carbon make changed inversely proportionally with the feed rate.

The mordenite catalyst of this example was also shown to be active for the cracking of a $C_5/C_6$ naphtha, identified as naphtha feed #3 in Table I. Products from the cracking of this feed stream also show higher isoparaffinic and aromatic concentrations. As previously indicated, the faujasite type zeolite is relatively ineffective for the purposes of the present invention. By way of illustration, a magnesium-faujasite catalyst, known to be a highly effective cracking catalyst, when used for the cracking of the above $C_5/C_6$ naphtha (#3) at 1000° F. and 1.3 v./v./hr., a diluent (steam) rate of 3300 s.c.f./b. and a total time on feed of 30 minutes, converted only 8.9% of the feed to $C_4^-$ products.

Example 2

The effect of pressure on the cracking process was examined in a fixed-bed catalytic cracking unit having a capacity of 200 cc. of catalyst using the hydrogen form of mordenite described in Example 1. Results of these runs are summarized in Table II.

TABLE II.—NAPHTHA CONVERSION SCREENING STUDIES

| Run No. | Feed, naphtha #1 | 1 | Feed, catalytic naphtha #2 | 2 |
|---|---|---|---|---|
| Boiling range, °F | 235/325 | | 318/425 | |
| Operating conditions: | | | | |
| Temperature, °F | | 900 | | 900 |
| Pressure, p.s.i.g | | 1,000 | | 1,000 |
| Feed rate, w./hr./w | | 2.2 | | 2.4 |
| Minutes fed | | 30 | | 30 |
| Diluent | | $H_2$ | | $H_2$ |
| Diluent rate, c.f./b | | 7,800 | | 6,100 |
| Product distribution, wt. percent: | | | | |
| Carbon | | 0.2 | | 2.4 |
| $C_3$-gas | | 6.0 | | 46.3 |
| $C_4+$ in gas | | 6.8 | | 2.9 |
| Liquid product | | 87.0 | | 48.4 |
| Liquid product: Gravity, °API | 56.2 | 60.0 | 36.9 | 41.1 |
| MS type anal., wt. percent: | | | | |
| Benzene | 0.11 | 0.41 | 0.18 | 0.74 |
| Toluene | 1.47 | 2.19 | 0.79 | 6.79 |
| $C_8$ arom | 6.69 | 7.57 | 3.16 | 17.38 |
| $C_9$ arom | 2.99 | 3.81 | 19.86 | 23.89 |
| $C_{10}$ arom | 1.15 | 1.48 | 16.19 | 11.70 |
| $C_{11}+$ arom | | | 17.16 | 9.64 |
| Total arom | 12.42 | 15.47 | 57.34 | 70.14 |
| Cyclopentanes | 1.70 | 4.59 | 4.93 | 2.49 |
| Cyclohexanes | 26.64 | 19.99 | 12.26 | 8.59 |
| Cond. naph | 3.64 | 4.02 | 6.37 | 1.70 |
| Paraffins | 55.59 | 55.93 | 19.09 | 17.08 |
| Gas distribution, wt. percent: | | | | |
| $H_2$ | | | | |
| $CH_4$ | | 1.3 | | 20.6 |
| $C_2H_4$ | | 0.1 | | |
| $C_2H_6$ | | 1.3 | | 20.4 |
| $C_3H_6$ | | 0.8 | | 0.2 |
| $C_3H_8$ | | 2.5 | | 5.2 |
| $C_4H_8$ | | 0.1 | | |
| i-$C_4H_{10}$ | | 2.3 | | 1.3 |
| n-$C_4H_{10}$ | | 0.7 | | 0.6 |
| $C_5H_{10}$ | | | | |
| i-$C_5H_{12}$ | | 1.0 | | |
| n-$C_5H_{12}$ | | 1.4 | | 0.4 |
| $C_6+$ | | 1.3 | | 0.5 |

Cracking activity is shown for both the 235/325° F. boiling range virgin naphtha and the 318/425° F. catalytic naphtha feeds under pressurized conditions. While the quantities of aromatics and isoparaffins produced were slightly lower than in the corresponding unpressurized runs, this was compensated for by the reduction in carbon make.

Example 3

Cracking tests were carried out in a small laboratory scale fixed-bed unit with the hydrogen form of mordenite described in Example 1. A summary of the effects of cycle time and space velocity is shown in Table III for the cracking of an N-decane feed stream.

TABLE III.—FIXED-BED CONVERSION OF N-DECANE AT 832° F. AND ATMOSPHERIC PRESSURE

| Cycle time, min | 30 | 10 | 10 | 10 | 3 |
|---|---|---|---|---|---|
| W./hr./w | 1.4 | 1.5 | 3.8 | 10.6 | 10.2 |
| Conversion, wt. percent | 49.6 | 100.0 | 55.6 | 38.9 | 59.0 |
| Product distribution, wt. percent: | | | | | |
| Carbon | 4.2 | 12.3 | 5.0 | 1.9 | 5.0 |
| $C_4$-Gas | 29.6 | 58.6 | 32.1 | 18.3 | 37.9 |
| $C_5$-$C_9$ | 15.8 | 29.1 | 18.5 | 18.7 | 16.1 |

These data show that at a cycle time of about 10 minutes or less, complete conversion of the feed is effected at low feed rates. With longer cycle times the catalyst deactivates, and in a 30-minute cycle time at the same feed rate, the overall conversion was only 49.6%. Increasing the feed rate in 10-minute cycles to 3.8 and 10.6 w./hr./w. decreased the conversion to 55.6% and 38.9%, respectively, although the $C_4$ gas yields remained high. A further decrease in cycle time to 3 minutes at the high feed rate (10.2 w./hr./w.) resulted in 59% conversion but with more than twice as much $C_4$ gas as $C_5$-$C_9$ fraction.

Example 4

A comparison of the hydrogen form of mordenite as described in Example 1 and a conventional cracking catalyst (75% silica–25% alumina) was run in a small laboratory scale fixed-bed unit on an N-decane feed stream. The results are summarized in Table IV.

TABLE IV.—FIXED-BED CONVERSION OF N-DECANE AT 832° F. AND ATMOSPHERIC PRESSURE; 10-12-MINUTE CYCLE TIME

| Catalyst | Mordenite-hydrogen form | 75% silica–25% alumina |
|---|---|---|
| W./hr./w | 3.8 | 3.9 |
| Conversion, wt. percent | 55.6 | 11.4 |
| Carbon | 5.0 | 0.3 |
| $C_4$-Gas | 32.1 | 7.4 |
| $C_5$-$C_9$ | 18.5 | 3.7 |

These tests show that the hydrogen form of mordenite is unexpectedly much more active for cracking decane than is a conventional silica-alumina cracking catalyst.

Example 5

A series of tests were run in a small laboratory scale fixed-bed unit employing mordenite exchanged with various cations to determine their activity as catalysts in the conversion of a cetane feed stream. Summarized data are shown in Table V.

TABLE V.—CETANE CRACKING WITH EXCHANGED MORDENITE CATALYSTS AT 832° F. AND ATMOSPHERIC PRESSURE; 20-MINUTE CYCLE TIME; 3.9-4.2 W./HR./W.

| Mordenite Form | Ca | Mg | Al | Co | H | Na | Ni |
|---|---|---|---|---|---|---|---|
| Conversion, wt. percent $C_{15}$ | 46.2 | 43.0 | 62.4 | 34.0 | 52.9 | 6.0 | 28.6 |
| Product dist., wt. percent: | | | | | | | |
| Carbon | 4.3 | 1.7 | 2.8 | 2.2 | 2.4 | 1.1 | 2.6 |
| $C_4$-Gas | 17.3 | 18.2 | 26.3 | 11.7 | 26.4 | 0.1 | 15.3 |
| $C_5$-$C_{15}$ | 24.6 | 23.1 | 33.3 | 20.1 | 24.1 | 4.8 | 10.7 |

Of these various forms of mordenite catalysts, the most active is the one exchange with aluminum. Additionally the aluminum form has the decided advantage of the most favorable selectivity to liquid products at a reasonable carbon level. Another favorable material is the mordenite catalyst exchanged with magnesium which gave high conversion at relatively low carbon and gas make levels.

Example 6

The crystalline zeolite catalysts of the present invention are improved in form for the purposes of hydrocarbon conversion processes by admixing the crystalline zeolite with a siliceous cogel, preferably a silica-alumina cogel. The resulting composite, after drying, consists of crystalline zeolite distributed through a silica-metal oxide cogel matrix and is found to exhibit improved catalytic selectivity, stability and fluidization properties.

In order to incorporate the crystalline zeolite catalyst into the siliceous cogel matrix, the zeolite crystals, which may be in either the sodium form or in one of the ion exchanged forms described previously, are added to a hydrogel, such as a silica-alumina hydrogel and the resulting mixture is homogenized by passage through a blending apparatus, such as a colloid mill, ball mill, and the like. The homogenized slurry is then formed into particles of a size range desired for fluidized bed operations. This is conveniently accomplished by spray drying, although other methods may be employed. The matrix particles are then preferably water washed to remove water-soluble material and oven dried. The dry product may then be subjected to a calcination treatment at temperatures above about 500° F., e.g., 500 to 1500° F., for about 8 to 24 hours. It may also be subjected to steam treatment at these temperature levels, e.g., 5 to 30 hours at 850 to 1200° F. The spray dried composite of the crystalline zeolite embedded in the matrix material will generally contain about 5 to 40 wt. percent zeolite.

The cracking of the 235–325° F. boiling virgin naphtha from South Louisiana crude (Naphtha #1 in Table I) with the composite catalyst is illustrated in Table VI. These tests were conducted in a captive fluid bed catalytic cracking unit at atmospheric pressure. It can be seen that the composite catalyst is much more active than the commercial silica-alumina catalyst. Also the composite catalyst, especially the spray dried catalyst containing 10 wt. percent of hydrogen-form mordenite, at a given conversion gives less coke and a more unsaturated gas than either the pure silica-alumina or the pure hydrogen-form mordenite.

TABLE VI

| Catalyst | $SiO_2/Al_2O_3$ [1] | H-Mordenite [2] | | | | 33% H-Mordenite, 67% $SiO_2/Al_2O_3$ [3] | | | 10% H-Mordenite, 90% $SiO_2/Al_2O_3$ [4] | |
|---|---|---|---|---|---|---|---|---|---|---|
| Temperature, °F | 950 | 900 | 900 | 950 | 950 | 900 | 900 | 950 | 950 | 950 |
| Feed rate, w./hr./w | 1.8 | 5.5 | 13.0 | 5.5 | 1.83 | 4.0 | 1.8 | 1.8 | 7.86 | 2.62 |
| Cracking time, minutes | 5 | 5 | 4 | 5 | 5 | 5 | 5 | 5 | 5 | 5 |
| Products, wt. percent of feed: | | | | | | | | | | |
| $H_2$ | 0.04 | 0.12 | 0.07 | 0.16 | 0.89 | 0.07 | 0.13 | 0.39 | 0.04 | 0.08 |
| $CH_4$ | 0.53 | 0.58 | 0.29 | 0.71 | 3.74 | 0.44 | 0.86 | 2.02 | 0.23 | 0.59 |
| $C_2H_4$ | 1.00 | 0.80 | 0.50 | 1.23 | 1.66 | 0.67 | 0.94 | 1.60 | 0.47 | 0.76 |
| $C_2H_6$ | 0.30 | 0.85 | 0.41 | 0.82 | 4.16 | 0.56 | 1.11 | 2.14 | 0.17 | 0.46 |
| $C_3H_6$ | 4.03 | 1.75 | 1.32 | 2.73 | 3.02 | 1.88 | 2.30 | 3.82 | 2.15 | 3.47 |
| $C_3H_8$ | 2.32 | 11.69 | 5.86 | 7.36 | 22.62 | 6.95 | 11.80 | 15.71 | 1.31 | 3.62 |
| Total $C_3-$ | 8.22 | 15.79 | 8.45 | 13.01 | 36.09 | 10.57 | 17.14 | 25.68 | 4.37 | 8.98 |
| $C_4H_8$ | 1.79 | 1.06 | 0.88 | 2.26 | 2.25 | 1.02 | 1.35 | 2.52 | 1.36 | 2.39 |
| i-$C_4H_{10}$ | 3.29 | 8.49 | 5.11 | 5.05 | 9.36 | 6.61 | 10.40 | 9.94 | 1.99 | 5.46 |
| n-$C_4H_{10}$ | 0.59 | 2.89 | 1.41 | 1.67 | 4.48 | 1.97 | 3.08 | 3.48 | 0.45 | 1.28 |
| Total $C_4$ | 5.67 | 12.44 | 7.40 | 8.98 | 16.09 | 9.60 | 14.83 | 15.94 | 3.80 | 9.13 |
| Total $C_5+$ liquid | 83.81 | 65.87 | 81.05 | 73.91 | 30.72 | 76.63 | 60.63 | 49.18 | 91.23 | 79.96 |
| Carbon | 2.3 | 5.9 | 3.1 | 4.1 | 17.1 | 3.2 | 7.4 | 9.2 | 0.6 | 1.9 |

[1] Commercial fluid $SiO_2/Al_2O_3$ cracking catalyst produced by Davison Chemical Corp.
[2] Hydrogen-form mordenite powder pilled and the pills crushed to fluidizable size.
[3] Hydrogen-form mordenite and $SiO_2/Al_2O_3$ powders mixed, pilled, and the pills cracked to fluidizable size.
[4] Hydrogen-form mordenite powder added to $SiO_2/Al_2O_3$ hydrogel and spray dried to fluidizable size.

Example 7

The cracking of the virgin $C_5-C_6$ Aramco naphtha (Naphtha #3 in Table I) with the composite catalyst is illustrated in Table VII. These tests were conducted in a captive fluid bed catalytic cracking unit at atmospheric pressure. It can be seen that the composite catalyst is much more active than the pure silica-alumina catalyst and that it gives less carbon and a more unsaturated gas than the pure mordenite catalyst.

TABLE VII

| Catalyst | $SiO_2/Al_2O_3$ [1] | H-Mordenite [2] | | 10% H-Mordenite, [3] 90% $SiO_2/Al_2O_3$ | |
|---|---|---|---|---|---|
| Temperature, °F | 950 | 950 | 950 | 950 | 950 |
| Feed rate, w./hr./w | 1.6 | 5.2 | 1.6 | 2.33 | 2.33 |
| Cracking time, minutes | 5 | 5 | 5 | 5 | 3 |
| Products, wt. percent of feed: | | | | | |
| $H_2$ | 0.01 | 0.21 | 0.41 | 0.05 | 0.05 |
| $CH_4$ | 0.16 | 0.95 | 2.40 | 0.38 | 0.49 |
| $C_2H_4$ | 0.32 | 1.26 | 1.29 | 0.72 | 0.94 |
| $C_2H_6$ | 0.13 | 1.29 | 3.29 | 0.40 | 0.55 |
| $C_3H_6$ | 1.27 | 3.42 | 2.02 | 3.05 | 3.66 |
| $C_3H_8$ | 0.61 | 16.10 | 33.40 | 4.67 | 6.57 |
| Total $C_3-$ | 2.50 | 23.23 | 42.81 | 9.27 | 12.26 |
| $C_4H_8$ | 0.06 | 0.00 | 0.19 | 0.58 | 0.68 |
| i-$C_4H_{10}$ | 0.15 | 3.38 | 5.64 | 1.70 | 2.15 |
| n-$C_4H_{10}$ | 0.10 | 2.86 | 4.28 | 0.82 | 1.30 |
| Total $C_4$ | 0.31 | 6.24 | 10.11 | 3.10 | 4.13 |
| Total $C_5+$ liquid | 96.19 | 65.53 | 36.58 | 86.39 | 81.56 |
| Carbon | 1.0 | 5.0 | 10.5 | 1.2 | 2.0 |

[1] Commercial fluid $SiO_2/Al_2O_3$ cracking catalyst produced by Davison Chemical Corp.
[2] Hydrogen-form mordenite powder pilled and the pills crushed to fluidizable size.
[3] Hydrogen-form mordenite powder mixed with $SiO_2/Al_2O_3$ hydrogel and spray dried to fluidizable size.

Samples of the Ca, Mg, Al, Co, H and Ni forms of mordenite incorporated into a silica-alumina matrix as described above are utilized in the cracking process described in Example 1. They are found to exhibit superior catalytic properties.

Various modifications may be made to the present invention. For example, the present cracking process may utilize many of the techniques normally found in conventional cracking processes. Such changes may be made by one skilled in the art without departing from the spirit of the present invention as defined by the claims.

What is claimed is:

1. An improved process for cracking light naphtha streams to obtain improved product quality which comprises subjecting said light naphthas boiling in the range of about 100° to 450° F. to cracking conditions in the presence of a mordenite catalyst, said catalyst comprising a mordenite zeolite having a silica to alumina mol ratio of about 9 to 15, an effective pore diameter in the range of about 6 to 10 A., and having the ability to adsorb at least 1.5 wt. percent of benzene at 205° F. at 0.5 atmosphere, said zeolite being further characterized in that it contains less than 5 wt. percent $Na_2O$, and recovering products boiling below said light naphthas and a naphtha product having improved octane number.

2. The process of claim 1 wherein said mordenite catalyst had been base exchanged with a cation selected from the group consisting of hydrogen-containing cations, calcium ion, magnesium ion, aluminum ion, cobalt ion and nickel ion.

3. The process of claim 2 wherein said mordenite catalyst had been base exchanged with a hydrogen-containing cation.

4. The process of claim 1 wherein said mordenite catalyst had been base exchanged with aluminum.

5. The process of claim 1 wherein said mordenite catalyst had been base exchanged with magnesium.

6. The process of claim 1 wherein said mordenite catalyst is embedded in a silica-metal oxide cogel matrix.

7. The process of claim 6 wherein said metal oxide is aluminum oxide.

8. The process of claim 6 wherein said mordenite catalyst had been base exchanged with a cation selected from the group consisting of hydrogen-containing cations, calcium ion, magnesium ion, aluminum ion, cobalt ion and nickel ion.

9. A process for upgrading petroleum naphtha boiling in the range of about 100° to 450° F. which comprises contacting said naphtha with a mordenite catalyst at a temperature of 700° to 1000° F. and a pressure of 0 to 25 p.s.i.g. to thereby convert said naphtha to lower boiling products having improved octane number, said mordenite catalyst being of the synthetic variety, containing less than 5 wt. percent $Na_2O$, and having a silica to alumina mole ratio of about 9 to 15 and an effective pore diameter in the range of about 6 to 10 A., and being further characterized by the ability to adsorb at least 1.5 wt. percent benzene at 205° F. and 0.5 atmosphere.

10. The process of claim 9 wherein said mordenite catalyst had been base exchanged with a cation selected from the group consisting of hydrogen-containing cations, calcium ion, magnesium ion, aluminum ion, cobalt ion and nickel ion.

11. A process for upgrading petroleum naphtha boiling in the range of about 100° to 450° F. which comprises contacting said naphtha with an aluminum-containing mordenite catalyst at a temperature of 700° to 1000° F. and a pressure of 0 to 25 p.s.i.g. to thereby convert said naphtha to lower boiling products having improved octane number, said aluminum-containing mordenite catalyst being of the synthetic variety and having a silica to alumina mole ratio of about 9 to 15 and an effective pore diameter of about 6 to 10 A., and being further characterized by the ability to adsorb at least 1.5 wt. percent benzene at 205° F. and 0.5 atmosphere, said mordenite having been base exchanged with an aluminum ion to reduce its $Na_2O$ content to less than 5 wt. percent.

References Cited by the Examiner

UNITED STATES PATENTS

| | | | |
|---|---|---|---|
| 2,962,435 | 11/1960 | Fleck et al. | 208—120 |
| 3,039,953 | 6/1962 | Eng | 208—120 |
| 3,114,696 | 12/1963 | Weisz | 208—66 |
| 3,140,251 | 7/1964 | Plank et al. | 208—120 |
| 3,190,939 | 6/1965 | Benesi | 260—683.65 |

DELBERT E. GANTZ, *Primary Examiner.*

ALPHONSO D. SULLIVAN, PAUL M. COUGHLAN, *Examiners.*